(12) United States Patent
Hammond

(10) Patent No.: US 7,346,929 B1
(45) Date of Patent: Mar. 18, 2008

(54) METHOD AND APPARATUS FOR AUDITING NETWORK SECURITY

(75) Inventor: Nicolas J. Hammond, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 09/592,404

(22) Filed: Jun. 13, 2000

Related U.S. Application Data

(60) Provisional application No. 60/146,175, filed on Jul. 29, 1999.

(51) Int. Cl.
*G06F 11/30* (2006.01)
*G06F 12/14* (2006.01)
*H04L 9/32* (2006.01)
*H04L 9/00* (2006.01)
*G06F 9/46* (2006.01)

(52) U.S. Cl. .................. 726/25; 713/188; 718/100

(58) Field of Classification Search ............... 713/201, 713/200, 188; 709/224; 705/53; 718/100; 726/25
See application file for complete search history.

(56) References Cited

U.S. PATENT DOCUMENTS

| | | | | |
|---|---|---|---|---|
| 5,032,979 A | * | 7/1991 | Hecht et al. | 713/201 |
| 5,812,763 A | * | 9/1998 | Teng | 713/201 |
| 5,892,903 A | * | 4/1999 | Klaus | 713/201 |
| 5,931,946 A | * | 8/1999 | Terada et al. | 713/201 |
| 5,961,644 A | * | 10/1999 | Kurtzberg et al. | 713/200 |
| 6,185,689 B1 | * | 2/2001 | Todd, et al. | 713/201 |
| 6,205,552 B1 | * | 3/2001 | Fudge | 713/201 |
| 6,282,546 B1 | * | 8/2001 | Gleichauf et al. | 707/102 |

(Continued)

FOREIGN PATENT DOCUMENTS

WO WO 1998/041919 A1 9/1998

OTHER PUBLICATIONS

Barrus et al. A Distributed Autonomous-Agent Network Intrusion Detection and Response System. Jun.-Jul. 1998. Proceedings of the 1998 Command and Control Research and Technology Symposium. p. 1-12.*

(Continued)

*Primary Examiner*—Christian LaForgia
(74) *Attorney, Agent, or Firm*—King & Spalding LLP

(57) ABSTRACT

In an apparatus for auditing security of a computer system, at least one secure application server is in communication with a global computer network. The secure application server is programmed to receive selectively security audit instruction data from a remote computer system via the global computer network. A plurality of scanning machines each are in communication with the global computer network and are programmed to execute selectively a security audit scan of the remote computer system via the global computer network. A central computer, having a memory, is configured as a database server and as a scheduler. The central computer is in communication with the secure application server and the scanning machine. The central computer is programmed to perform the following operations: evaluate a database to determine if a security audit scan is currently scheduled to be run for a user; determine which of the plurality of scanning machines is available to perform a security audit scan; copy scan-related information into a scanning machine determined to be available and instruct the scanning machine to begin scan; and record the results of the scan in the memory.

46 Claims, 2 Drawing Sheets

U.S. PATENT DOCUMENTS

| | | | | |
|---|---|---|---|---|
| 6,298,445 | B1* | 10/2001 | Shostack et al. | 713/201 |
| 6,301,668 | B1* | 10/2001 | Gleichauf et al. | 713/201 |
| 6,321,338 | B1* | 11/2001 | Porras et al. | 713/201 |
| 6,324,656 | B1* | 11/2001 | Gleichauf et al. | 714/37 |
| 6,347,374 | B1* | 2/2002 | Drake et al. | 713/200 |
| 6,484,203 | B1* | 11/2002 | Porras et al. | 709/224 |
| 6,517,587 | B2* | 2/2003 | Satyavolu et al. | 715/501.1 |
| 6,530,024 | B1* | 3/2003 | Proctor | 713/201 |
| 6,535,227 | B1* | 3/2003 | Fox et al. | 345/736 |
| 6,546,493 | B1* | 4/2003 | Magdych et al. | 713/201 |
| 6,574,737 | B1* | 6/2003 | Kingsford et al. | 713/201 |
| 6,578,147 | B1* | 6/2003 | Shanklin et al. | 713/200 |
| 2002/0104014 | A1* | 8/2002 | Zobel et al. | 713/200 |

OTHER PUBLICATIONS

Zamboni et al. An Architecture for Intrusion Detection using Autonomous Agents. 1998. p. 1-12.*

Internet Security Systems, SAFEsuite Enterprise, SAFEsuite Decisions, 1998. (Pertinent pp. 15-23, ch. 2, sect B).

Ko et al., Execution Monitoring of Security-Critical Programs in Distributed Systems: A Specification-Based Approach, 1997, Proceedings of the 1997 IEEE Symposium on Security and Privacy, pp. 175-187. (Pertinent p. 186, para. 6).

Anderson et al., Next-Generation Intrusion Dectection Expert System (NIDES), A Summary, May 1995, SRI International, pp. 1-37. (Pertinent pages 20-26, sects. 2.5.1-2.5.2).

Denning, An Intrusion-Detection Model, Feb. 1987, IEEE Transactions on Software Engineering, vol. SE-13, No. 2, pp. 1-17. (Pertinent pp. 3-5, sect. 1V).

Lindqvist et al., eXpert-BSM: A Host-based Intrusion Dectection Solution for Sun Solaris, SRI International, Menlo Park, California, Dec. 10-14, 2001, Proceedings of the 17th Annual Computer Security Applications Conference, pp. 1-12. (Pertinent pp. 7-9, sects. 4.2-4.3).

NetworkICE Corporation, ICEcap Administrator's Guide, Version 1.0 BETA, 1999, pp. 1-142. (Pertinent pp. 79-82).

SRI International, A Prototype IDES: A Real-Time Intrusion-Detection Expert System, Aug. 1987, p. 1-63. (Pertinent pp. 25-41, sects. 7.1.1-7.5.3).

Lunt, Teresa, Automated Audit Trail Analysis and Intrusion Detection: A Survey, Proceedings of the 11th National Computer Security Conference, Oct. 1988, pp. 1-8. (Pertinent pp. 4-5, sect. 3.2).

Bace, An Introduction to Intrusion Detection and Assessment for System and Network Security Management, Apr. 1999, pp. 1-38. (Pertinent pp. 24-27).

RealSecure, Adaptive Network Security Manager Module Programmer's Reference Manual, 1999, pp. 1-74. (Pertinent pp. 5-6, ch. 2).

Perrochon et al., Enlisting Event Patterns for Cyber Battlefield Awareness, DARPA Information Survivability Conference and Exposition, 2000, DISCEX Proceedings, Jan. 2000 Stanford University, pp. 1-12. (Pertinent pp. 6-10, sects. 3.1-3.2).

Cuppens, Cooperative Intrusion Detection, pp. 1-10. (Pertinent pp. 4-9, sects. 4-7).

Mukherjee et al., Network Intrusion Detection, IEEE Network, May/Jun. 1994, pp. 26-41. (Pertinent p. 30, sect. Intrusion Detection Expert System (IDES)).

Bass, Intrusion Detection System and Multisensor Data Fusion, Apr. 2000, Communications of the ACM, vol. 43, No. 4, pp. 99-105. (Pertinent pp. 101-105, sects. 2-3).

Metcalf et al., Intrusion Detection System Requirements, Sep. 2000, Mitre Corporation, pp. 1-33. (Pertinent pp. 3-11).

RealSecure Release 1.2 for UNIX A User Guide and Reference Manual, 1997, Internet Security Systems, Inc., pp. 1-92. (Pertinent pp. 55-78).

Internet Scanner SAFE SAFEsuite 4.0 User Guide and Reference Manual, 1996, Internet Security Systems, Inc., pp. 1-158. (Pertinent pp. 4-2 to 4-9, ch. 4).

Anderson et al., Detecting Unusual Program Behavior Using the Statistical Components of the Next-Generation Intrusion Detection Expert System (NIDES), May 1995, SRI International, pp. 1-89. (Pertinent pp. 15-23, sects. 3.1-3.4.4).

"Internet Scanner™, User Guide," Version 6.0, Copyright © 1999 by Internet Security Systems, Inc., pp. 1-182. (Pertinent pp. 9-36, ch. 2).

Mounji et al., Distributed Audit Trail Analysis, Proceedings of the Symposium on Network and Distributed System Security, San Diego, CA, Feb. 16-17, 1995, pp. 102-112. (Pertinent pp. 102-112, sects. 5-7).

Fisch et al., "The Design of an Audit Trail Analysis Tool," Proceedings of the 10th Annual Computer Security Applications Conference, Dec. 5-9, 1994, Orlando, Florida, pp. 126-132. (Pertinent pp. 126-127, sects. 1-2).

Varadharajan, Vijay, "Design and Management of a Secure Networked Administration System: A Practical Approach," 18th National Information Systems Security Conference, Oct. 22-25, 1995, Baltimore, Maryland, pp. 570-580. (Pertinent pp. 570-571, sect. 2).

* cited by examiner

METHOD AND APPARATUS FOR AUDITING NETWORK SECURITY

CROSS REFERENCE TO RELATED APPLICATIONS

This application is related to provisional application Ser. No. 60/146,175, filed Jul. 29, 1999, which is incorporated by reference, and claims the benefit of its earlier filing date under 35 USC Section 119(e).

BACKGROUND OF THE INVENTION

1. Field of the Invention

The present invention relates to computer network security and, more specifically, to a method and apparatus for auditing computer network security.

2. Description of the Prior Art

As use of large computer networks becomes more prevalent, computer security increases in importance. To reduce networked computer vulnerability, many organizations run periodic security audit scans of their computer systems. Such scans typically involve a dedicated scanning machine that attempts to gain unauthorized access to a computer system via a computer network through a variety of methods. The scanning machine will make numerous attempts to gain access and maintain a record of any security breaches that it detects.

Conventional scanning systems perform scans on command and are frequently dedicated to only a single user. Thus, scans are not performed periodically unless the user remembers to activate the scanning machines. Furthermore, many scanning machines are idle for large periods of time.

Therefore, there is a need for a scanning system that periodically schedules security scans of several users.

SUMMARY OF THE INVENTION

The disadvantages of the prior art are overcome by the present invention which, in one aspect, is an apparatus for auditing security of a computer system. At least one secure application server is in communication with a global computer network. The secure application server is programmed to receive selectively security audit instruction data from the remote computer system via the global computer network. A plurality of scanning machines each are in communication with the global computer network and are programmed to execute selectively a security audit scan of the remote computer system via the global computer network. A central computer, having a memory, is configured as a database server and as a scheduler. The central computer is in communication with the secure application server and the scanning machine. The central computer is programmed to perform the following operations: evaluate a database to determine if a security audit scan is currently scheduled to be run for a user; determine which of the plurality of scanning machines is available to perform a security audit scan; copy scan-related information into a scanning machine determined to be available and instruct the scanning machine to begin scan; and record the results of the scan in the memory.

In another aspect, the invention is a method of auditing security of a computer system in which an instruction to perform a security audit scan on a computer system is received from a user via a global computer network. A scanning machine is instructed to access the remote computer system via the global computer network and thereby perform a security audit scan of the remote computer system. At least one result of the security audit scan is reported to the user once the security audit scan is complete.

In yet another aspect, the invention is a method of auditing computer system security in which a database is accessed to determine when a security audit scan of a computer system is to be executed. Upon determining that a security audit scan of the remote computer system is to be executed, security audit scan data is copied into a scanning system, the scanning system is caused to establish communication with the remote computer system via a global computer network and to execute a security audit scan of the remote computer system via the global computer network. A result of the security audit scan of the global computer network is stored and a message is transmitted to a user of the remote computer system that indicates the result of the security audit scan.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
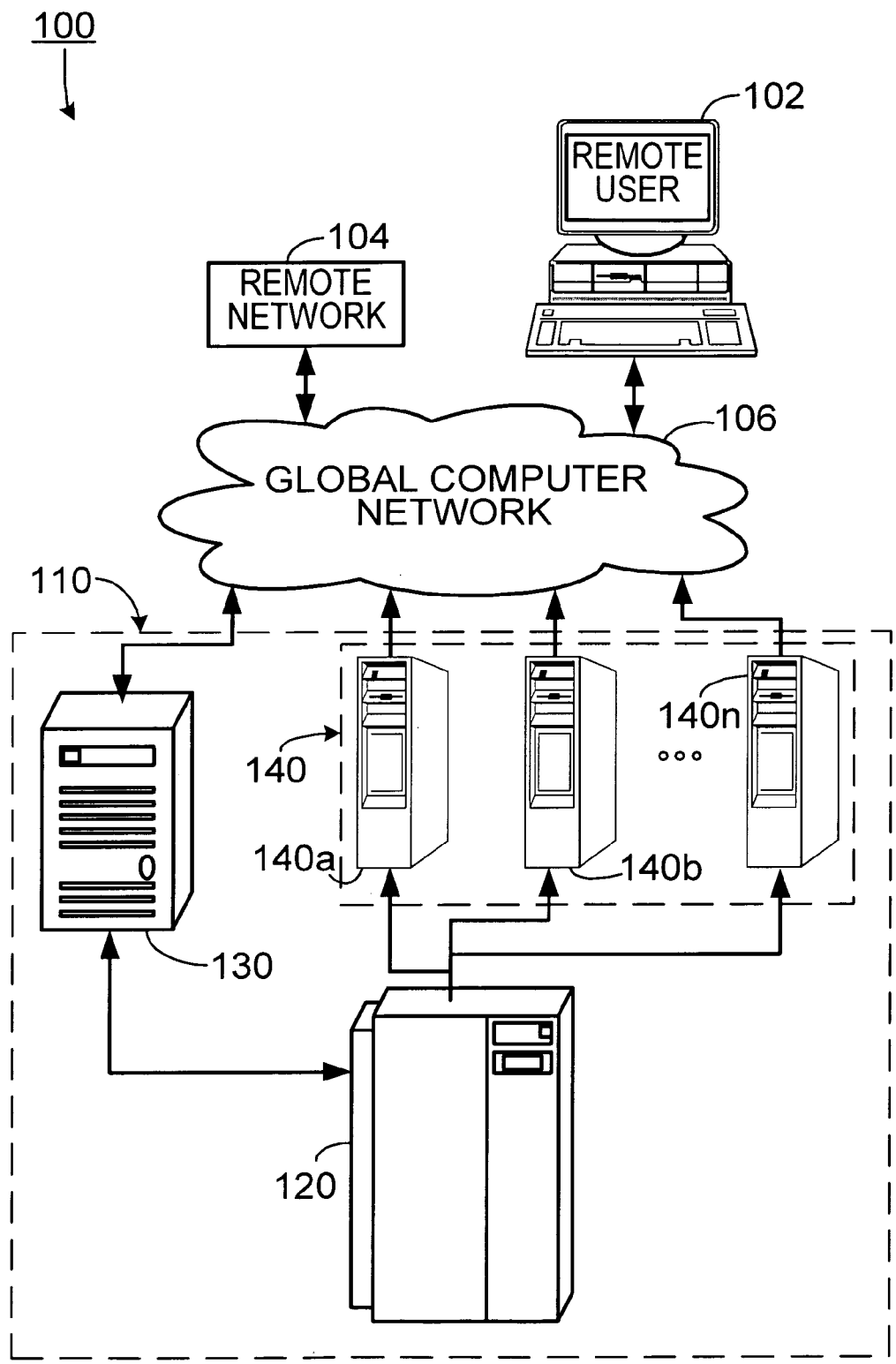
FIG. 1 is a schematic diagram of the devices employed in one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "the" includes plural references, the meaning of "in" includes "in" and "on." Also, as used herein, "global computer network" includes the Internet. A "secure application server" could include any digital machine that controls a computer communication and includes security features that inhibit unauthorized access.

As shown in FIG. 1, one embodiment of an apparatus 100 for auditing security of a remote computer system 102 or a remote network 104 is resident at a central site 110. A central computer 120, including a computer-readable memory, is configured as a database server and acts as a scheduler. The central computer 120 is in communication with at least one secure application server 130 and a plurality of scanning machines 140, of the type generally known in the art of computer network security analysis. The secure application server 130 (for example, an Internet Web server) is in communication with a global computer network 106 (such as the Internet) and is programmed to receive selectively security audit instruction data from the remote computer system 102 via the global computer network 106. A plurality of scanning machines 140a-n is in communication with the global computer network 106 and each is programmed to execute selectively a security audit scan of the remote computer system 102 via the global computer network 106. A security audit scan could include, but is not limited to, any combination of the following forms of security assessments generally known to the art of computer network security analysis: security audit scan; security scan; audit; audit scan; remote assessment; vulnerability assessment; vulnerability analysis; and penetration study.

Figure 2:
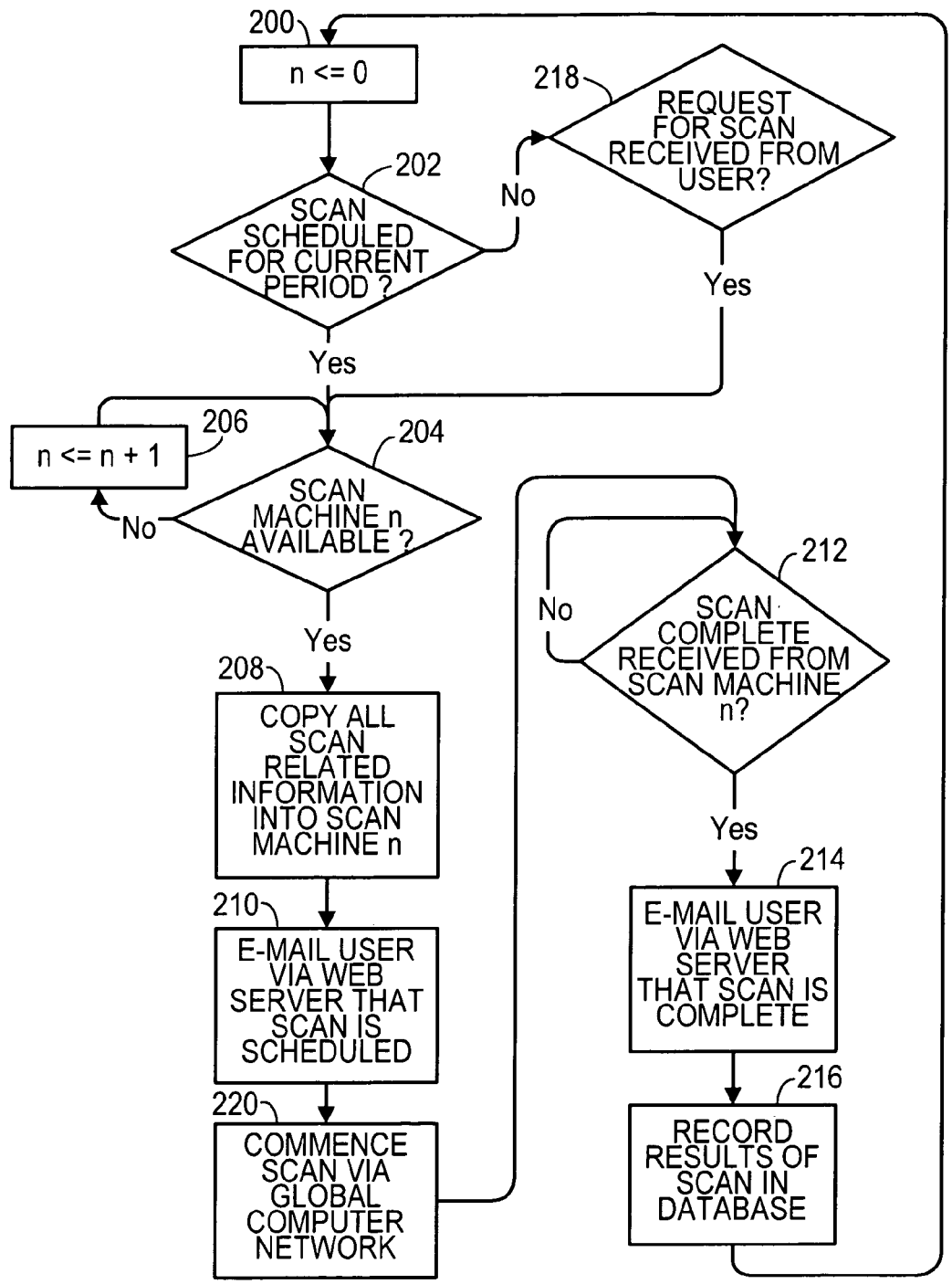
FIG. 2 is a flow chart showing the steps executed in one embodiment of the invention.

As shown in FIG. 2, one illustrative embodiment of the general procedure executed by the central computer 120 includes assigning 200 the value of zero to an iteration variable and performing a test 202 to determine whether a security audit scan is scheduled for the current period. If a scan is not scheduled, the central computer 120 performs a test 118 to determine if a user has requested a scan. If a scan is scheduled, or if the user has requested a scan, the central computer finds the next available scanning machine by iteratively performing a test 204 to determine if the scanning machine designated as the current value of the iteration variable is available and, if it is not available, incrementing 206 the iteration variable and returning the thread of execution to test 204. When a scanning machine is found to be available, the necessary scan related information is copied 208 from the central computer 120 to the scanning machine and a message is e-mailed 210 to the user that indicates that a scan is scheduled and that the scan is commencing. The central computer 120 then instructs 220 the scanning system to establish communication with the remote computer system via a global computer network and commence the scan.

Once the scanning machine begins performing the scan, the central computer 120 repeatedly performs a test 212 to determine whether a "scan complete" indication is received from the scanning machine. If a "scan complete" indication is received, then an e-mail is sent to the user 214 indicating that the scan is complete. The results of the scan are then recorded 216 in a database resident in the central computer 120 or on a file system of another database machine. The results could include an indication that the scan is complete, the date and time of the scan, the nature of the tests performed during the scan and the nature of any deficiencies detected by the scan. The results of the scan may then be used for generating a scan report and other uses, such as statistical analyses, etc.

While one illustrative embodiment of the procedure executed by the central computer 120 is shown in FIG. 2, it will be readily understood that many other scan scheduling algorithms could be employed without departing from the scope of the invention so long as the algorithm employed provides for scheduling a scan of a remote system, selecting an available scanning machine and instructing the selected scanning machine to execute a scan via a global computer network.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for auditing security of a remote computer system, comprising:
   a. a secure application server in communication with a global computer network and programmed to receive selectively security audit instruction data from the remote computer system via the global computer network;
   b. a plurality of scanning machines in communication with the global computer network and programmed to execute selectively a security audit scan of the remote computer system via the global computer network, each scanning machine capable of conducting multiple types of security assessments; and
   c. a central computer, having a memory, configured as a database server and as a scheduler, in communication with the secure application server and the plurality of scanning machines, programmed to perform operations comprising:
      a. evaluating a database to determine if the security audit scan is currently scheduled to be run on one of the scanning machines;
      b. determining which of the plurality of scanning machines is available to perform the security audit scan by examining a schedule for each scanning machine to identify certain ones of the scanning machines that are conducting another security audit scan or are scheduled to conduct another security audit scan, the available scanning machines comprising all of the scanning machines except for the certain scanning machines;
      c. copying scan-related information into one of the available scanning machines and instructing the scanning machine to begin the security audit scan; and
      d. recording the results of the security audit scan in the memory.

2. The apparatus of claim 1, wherein the secure application server comprises a Web server.

3. The apparatus of claim 1, wherein the central computer is further programmed to issue a notification the security audit scan is commencing.

4. The apparatus of claim 1, wherein the central computer is further programmed to update the database to indicate that the security audit scan is complete.

5. The apparatus of claim 1, wherein the central computer is further programmed to send a signal representing completion of the security audit scan.

6. The apparatus of claim 1, wherein when the central computer performs the operation in which the central computer records the results of the security audit scan, the central computer also copies the results to the database and copies a report to a file system on a database machine when the security audit scan is complete.

7. A method of auditing security of a remote computer system, comprising the steps of:
   a. receiving an instruction to perform a security audit scan on the remote computer system;
   b. determining which of a plurality of scanning machines is available to perform the security audit scan by examining a schedule for each of the scanning machines to identify certain ones of the scanning machines that are conducting another security audit scan or are scheduled to conduct another security audit scan, the available scanning machines comprising all of the scanning machines except for the certain scanning machines, and wherein each of the scanning machines is capable of conducting a plurality of security assessments; and
   c. instructing one of the available scanning machines to access the remote computer system via a global computer network to perform the security audit scan of the remote computer system.

8. The method of claim 7, further comprising the step of recording a result of the security audit scan in a computer memory.

9. The method of claim 7, further comprising the step of receiving at the available scanning machine scan related information for the security audit scan of the remote computer system.

10. The method of claim 9, wherein the scan related information comprises at least one security assessment to be conducted during the security audit scan.

11. The method of claim 9, wherein the scan related information comprises an identity of at least one remote computer system upon which to conduct the security audit scan.

12. The method of claim 7, further comprising the step of sending a message to a user interface that the security audit scan is being conducted.

13. The method of claim 7, wherein the security audit scan comprises a vulnerability assessment.

14. The method of claim 7, wherein the security audit scan comprises a penetration study.

15. The method of claim 7, further comprising the step of recording a result of the security audit scan in a database.

16. The method of claim 15, wherein the result comprises at least one vulnerability of the remote computer system detected by the available scanning machine during the security audit scan.

17. The method of claim 16, wherein the result further comprises a list of at least one security assessment conducted during the security audit scan.

18. The method of claim 7, further comprising the step of determining if the available scanning machine is currently conducting the security audit scan on the remote computer system.

19. The method of claim 7, further comprising the step of receiving from the available scanning machine a notification at a central computer that the security audit scan of the remote computer system is complete.

20. The method of claim 19, further comprising the step of reporting at least one result of the security audit scan to a user interface.

21. The method of claim 20, wherein the at least one result of the security audit scan is reported in response to receiving the notification at the central computer that the security audit scan is complete.

22. A method of auditing computer system security, comprising the steps of:
   a. receiving a schedule request for a security audit scan of a remote computer system, wherein the security audit scan of the remote computer system is scheduled to be conducted after the schedule request is received;
   b. recording the scheduled security audit scan in a database;
   c. accessing the database to determine when the scheduled security audit scan of the remote computer system is to be executed;
   d. in response to a determination that the scheduled security audit scan of the remote computer system is to be executed in a predetermined period of time performing the following steps:
      i. determining which of a plurality of scanning machines is available to perform the scheduled security audit scan by examining a schedule for each of the scanning machines to identify ones of the scanning machines that are conducting another security audit scan or are scheduled to conduct another security audit scan;
      ii. copying security audit scan data into a scanning system;
      iii. causing the scanning system to establish communication with the remote computer system via a global computer network; and
      iv. causing the scanning system to execute the scheduled security audit scan of the remote computer system via the global computer network.

23. The method of claim 22, further comprising the step of transmitting a message to a user interface that indicates a result of the scheduled security audit scan.

24. The method of claim 22, further comprising the step of storing a result of the scheduled security audit scan of the remote computer system in the database.

25. The method of claim 24, wherein the result is used for a statistical analysis of security on the remote computer system.

26. The method of claim 22, further comprising the step of determining which of a plurality of scanning systems is available to perform the scheduled security audit scan by examining a schedule of each of the scanning systems to identify certain ones of the scanning systems that are conducting another security audit scan or are scheduled to conduct another security audit scan, the available scanning systems comprising all of the scanning systems except for the certain scanning systems.

27. The method of claim 22, further comprising the step of examining the scanning system to determine if the scheduled security audit scan is in the process of being conducted on the remote computer system.

28. The method of claim 22, wherein the security audit scan data comprises at least one security assessment to be conducted during the scheduled security audit scan.

29. The method of claim 22, wherein the security audit scan data comprises an identity of at least one remote computer system upon which to conduct the scheduled security audit scan.

30. The method of claim 22, further comprising the step of sending a message to a user interface prior to the commencement of the scheduled security audit scan.

31. The method of claim 22, further comprising the step of storing a result of the scheduled security audit scan of the remote computer system.

32. The method of claim 31, wherein the result comprises at least one vulnerability of the remote computer system detected by the scanning system during the scheduled security audit scan.

33. The method of claim 32, wherein the result further comprises a list of at least one security assessment conducted during the scheduled security audit scan.

34. The method of claim 22, further comprising the step of determining if a request for an immediate security audit scan of one of a plurality of computer systems has been received in response to a determination that the scheduled security audit scan of the remote computer system will be executed outside of the predetermined period of time.

35. The method of claim 22, further comprising the step of receiving from the scanning system a notification at a central computer that the scheduled security audit scan of the remote computer system is complete.

36. A method of conducting a security audit scan of a remote computer system comprising the steps of:
   a. receiving a request to schedule the security audit scan of the remote computer system;
   b. recording a scheduled security audit scan in a database;
   c. accessing the database to determine when the scheduled security audit scan of the remote computer system is to be executed; and d. in response to a determination that the scheduled security audit scan of the remote computer system is to be executed, performing the following steps:
  1. determining which of a plurality of scanning machines is available to perform the scheduled security audit scan by examining a schedule for each of the scanning machines to identify certain ones of the scanning machines that are conducting another security audit scan or are scheduled to conduct another security audit scan; and
  causing one of the available scanning machines to access the remote computer system and execute the scheduled security audit scan.

37. The method of claim 36, further comprising the step of receiving at the available scanning machine scan related information from a central computer for the scheduled security audit scan of the remote computer system.

38. The method of claim 37, wherein the scan related information comprises at least one security assessment to be conducted during the scheduled security audit scan.

39. The method of claim 36, further comprising the step of sending a message to a user interface that the scheduled security audit scan is being conducted.

40. The method of claim 36, wherein the scheduled security audit scan comprises a vulnerability assessment.

41. The method of claim 36, further comprising the step of recording a result of the scheduled security audit scan in the database.

42. The method of claim 41, wherein the result comprises at least one vulnerability of the remote computer system detected by the available scanning machine during the scheduled security audit scan.

43. The method of claim 36, further comprising the step of examining the available scanning machine to determine if the scheduled security audit scan is in the process of being conducted on the remote computer system.

44. The method of claim 36, further comprising the step of receiving from the available scanning machine a notification at a central computer that the scheduled security audit scan is complete.

45. The method of claim 36, further comprising the step of reporting at least one result of the scheduled security audit scan to a user interface.

46. The method of claim 45, wherein the at least one result is reported in response to receiving a notification at a central computer that the scheduled security audit scan is complete.

* * * * *